March 2, 1965 P. L. SISSON 3,171,694
ELECTRIC-HYDRAULIC TOW BRAKE UNIT
Filed Oct. 3, 1961 2 Sheets-Sheet 2

INVENTOR
PURDY L. SISSON
BY
ATTORNEYS

United States Patent Office 3,171,694
Patented Mar. 2, 1965

3,171,694
ELECTRIC-HYDRAULIC TOW BRAKE UNIT
Purdy L. Sisson, Paducah, Ky., assignor to Temptron Corporation, Paducah, Ky., a corporation of Kentucky
Filed Oct. 3, 1961, Ser. No. 142,682
3 Claims. (Cl. 303—7)

This invention relates to controlling means for the brakes of towed and towing vehicles. The invention is illustrated in the drawings as embodying two forms of the invention. In a first form, the control connections are associated with the master brake cylinders of two passenger vehicles; for example, the operation of the master cylinder of the towing vehicle being utilized to actuate a master-master cylinder in such manner as to deliver to the master cylinder of the towed vehicle the same degree of pressure that has been imposed physically by the driver of the towing vehicle upon the master cylinder of the said towing vehicle.

In the other form of the invention, the actuation of the brakes of the towing vehicle is wholly independent of the braking effect imposed upon a towed trailer; in this case, the driver of the towing vehicle controls the brakes of a towed trailer by a separate hand-operated element. The actuation of this hand-operated element closes electric circuits, by means of which electric current, of a strength varying in accordance with the degree of movement of said hand-operated element, is utilized to actuate a master brake cylinder, from which braking fluid pressure is delivered in equal degree to the brake cylinders of the independent wheels of the trailer.

At the present time, many trailers for hauling light loads are rented freely from establishments maintaining trailer rental services, and these establishments attach, to the rear bumper of a passenger automobile, a hitch through which the trailer is towed by the passenger vehicle. Many of these trailers have no brakes of their own, and no means through which the driver of the towing vehicle can apply a braking effect upon them, other than by merely braking his own driven vehicle. This has been found to create a very dangerous situation, because if the hitch becomes disconnected, the trailer will be turned loose to run, unguided, into the path of oncoming traffic. Further, the driver of a towing car, to which a trailer is attached, not only has to provide for the braking of his own vehicle, but he also must check the impetus of the load, represented by the trailer, through the application of his own brakes.

Traffic officials in some states are seeking legislation requiring goods-carrying trailers to have their own brakes, and to have the structure so arranged that the braking effect of said trailer brakes may be controlled from the towing vehicle.

The second form of this invention contemplates the addition to a towed trailer of brakes, acting upon its several wheels, to a degree imposed thereon at the will of the operator of and from the towing vehicle. The invention will be best understood by reference to the accompanying drawings, wherein:

FIG. 3 is a side view of a pressure-actuated circuit-controlling member, hereinafter described, and FIG. 4 is a face view of the structure of FIG. 3, looking from the left, and with parts broken away.

Figure 1:
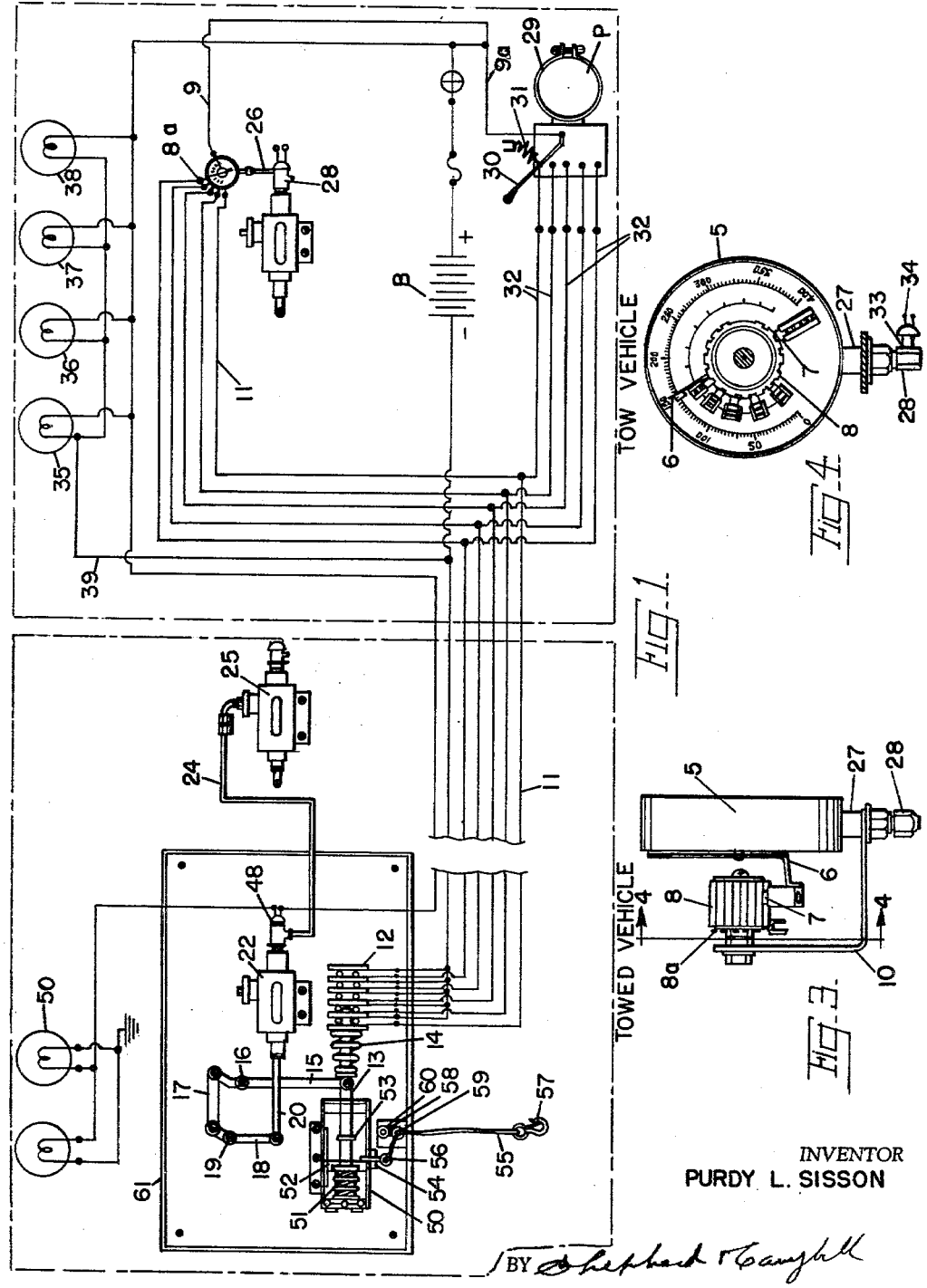
FIGURE 1 is a diagrammatic view illustrating a system including the brake control means of both a towed and a towing automobile.

The means employed are designedly made in such form that the application thereof to the towed and towing vehicles may be effected in a very short time and with the expenditure of very little labor. The procedure is as follows. The pressure-actuated circuit-controlling member, or switch, illustrated in FIG. 3 is connected into the hydraulic brake fluid line of the towing vehicle adjacent the conventional master cylinder of such vehicle. The pressure switch is connected to the battery of the towing vehicle as described. The multiple lead cable is connected to the described master-master unit. The master-master unit is connected by the flexible, very strong hydraulic hose to the master cylinder of the towed vehicle.

Referring to the drawings, and particularly to FIGS. 1, 3 and 4, 5 designates the casing of a pressure-operated element similar to the well known pressure gauges, in which a movable hand moves over a graduated scale to indicate varying degrees of pressure. 6 indicates a rotative member corresponding to the usual indicating hand of such a gauge, and I utilize this member to carry a contact brush 7, which contacts with and moves over the segments 8, which segments complementally make up a commutator-like body, said segments being insulated from each other.

This commutator-like body is fixed, and the brush 7 moves over the segments to a degree determined by the pressure delivered into the pressure-operated element 5. The conventional battery of the tow vehicle is indicated at B, and a conductor 9 connects the battery to a point of connection, upon the pressure-operated element, which may be at 10. Current passes from 10 through the body of casing 5, member 6, brush 7, to the particular segments which may be then contacted by the brush. The brush is wide enough to contact the segment ahead before it leaves any segment. This insures continuity of current flow and prevents jerky action of the brakes, as will be apparent as the description proceeds.

The segments 8 carry out-standing binding posts 8a, from which a plurality of conductors 11 lead to the ring-like windings 12, a plurality of which complementally make up the stator of a solenoid magnet. The core 13 of the solenoid is drawn inwardly against the tension of a spring 14 to a point determined by which of the windings 12 is energized. A lever 15, pivoted at 16, has its upper end connected by link 17 to the upper end of a rocking arm 18, which arm is pivotally mounted at 19. The lower end of arm 18 is pivotally connected to the outer end of the plunger rod 20, by which a plunger (not shown) of a master-master cylinder 22 is actuated. The master-master cylinder is connected by a strong, flexible hydraulic hose 24 to the conventional master cylinder 25 of the towed vehicle.

The structure of FIG. 3 is connected into the brake fluid line 26 of the tow vehicle by a connection 27 into the T 28. Then the variations in fluid pressure resulting from the actuation of the conventional foot brake pedal by the driver of the tow vehicle will move the brush 7 in a way to deliver electrical energy from the binding posts 8a through leads 11 to the solenoid magnet. This solenoid will move the plunger of the master-master cylinder as described, whereby to impose upon the master cylinder 25 the same fluctuations of pressure that are being imposed by the driver of the towing vehicle upon the fluid brake system of his vehicle.

The steering post of the towing vehicle is indicated at P in FIG. 1, and a strap 29 about said post supports a hand-actuated circuit-controlling element in the nature of a rheostat. The operating handle, 30, thereof is maintained in "up" or "off" position by a spring 31. Manual operation of handle 30 completes a circuit through a branch conductor 9a to any one of the leads 32, which leads in turn are connected to the leads 11.

Thus, the operation of handle 30 enables the operator of the towing vehicle to effect a braking action upon the towed vehicle if the usual foot-controlled brakes of the towed vehicle should fail to function. In this event, the operator is able not only to apply the conventional brakes upon the towing vehicle, but he can use the drag of the towed vehicle to exert a braking action upon his own vehicle.

When operation of the foot brake of a towing vehicle increases the pressure in T 28, a plunger 33 is forced outwardly, this element carrying the conventional contact points 34 through which conventional stop lights 35, 36, 37 and 38, of both vehicles, are lighted through a circuit 39. The structure of FIG. 2 differs from the structure of FIG. 1 in that it is intended to utilize many of the features of FIG. 1 to apply a braking action to towed trailers, rather than to apply a braking action to two passenger vehicles, each of which is equipped with its own master cylinder and hydraulic brakes.

Figure 2:
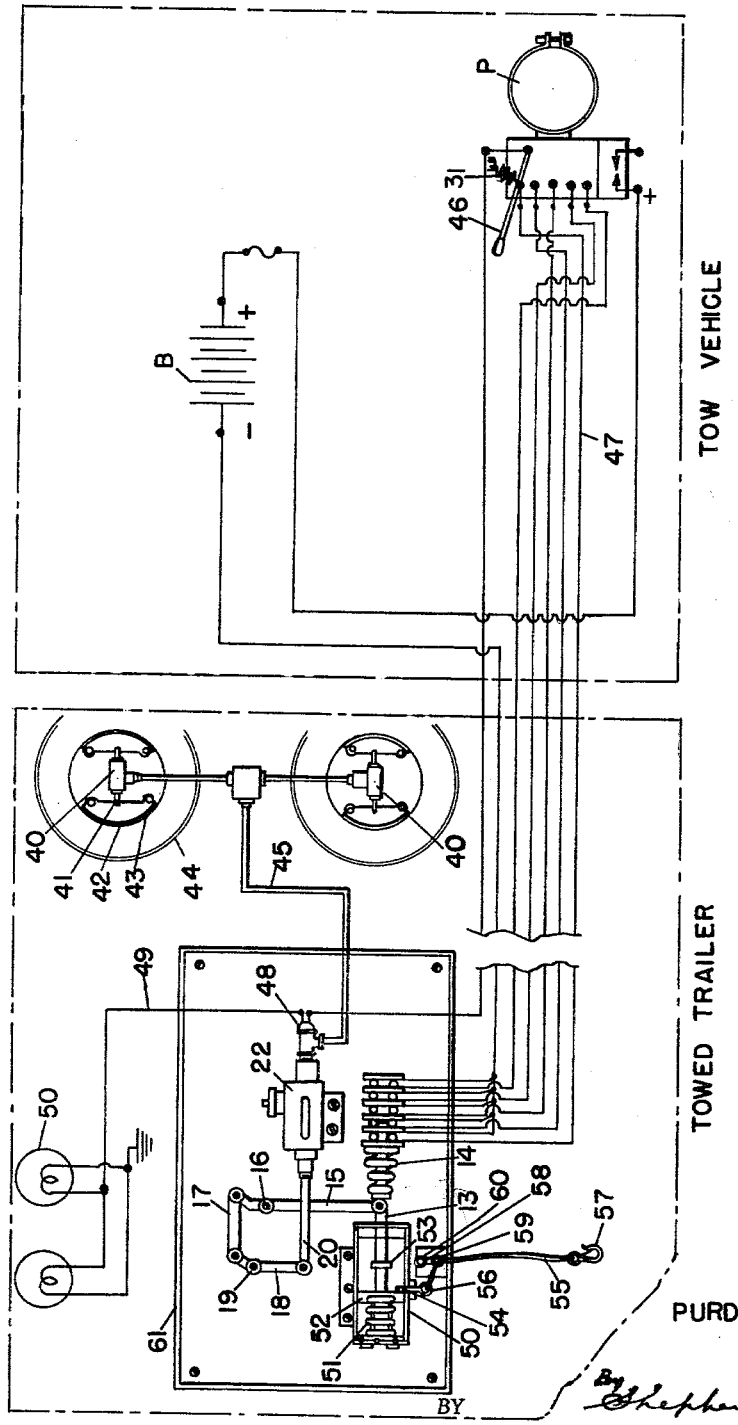
FIG. 2 is a diagrammatic view illustrating the arrangement of the controlling elements of a system in which the towed vehicle is of the trailer type and in which a mechanically-operated member upon the towing vehicle controls the brakes of the trailer independently of the brakes of the towing vehicle.

The trailers to which the structure of FIG. 2 is to be applied are the relatively light- low-cost trailers which may be rented for temporary use, usually to haul relatively light loads. Under present conditions, many of these trailers have no brakes at all, and the only braking action which can be imposed upon them is that arising from the braking of the towing vehicle. Many of these small trailers are of the two-wheel variety, and I have illustrated the structure of FIG. 2 in conjunction with a two-wheel trailer and have applied fluid-pressure brakes to the wheels of such trailer.

In this modified trailer-braking arrangement of FIG. 2, 40 designates pressure-fluid cylinders, the plungers 41 of which act upon conventional brake shoes 42, said cylinders and shoes being disposed within brake drums 43 applied to trailer wheels, a portion of one of which is indicated at 44. In this case, a flexible, high-pressure hose line 45 conducts fluid pressure to the cylinders 40 to apply the brakes.

The application of pressure fluid to the wheel cylinders 40 is effected by the driver of the towing vehicle through his manual manipulation of a handle 46, and which handle operates after the manner of the control element of a rheostat to selectively make contact through which any one of the leads 47 may be energized. These leads are connected to the successively energized windings of a solenoid magnet. The structure by which this is accomplished is that already described with respect to FIG. 1, and the effect is to vary the fluid pressure imposed upon the cylinder 22. However, this cylinder does not then function as a master-master cylinder, but functions merely as a master cylinder to impose pressure upon line 45 and consequently to actuate the brake shoes 42.

Thus it will be seen that the structure of FIG. 2 is wholly independent of the brake system of the towing vehicle, but is under the independent manual control of the driver of the towing vehicle through the manipulation of handle 46. It is to be understood that the line 45 is a flexible, high-pressure fluid line connection. When the plunger of cylinder 22 moves to the right in FIG. 2 to apply the brakes, it also moves a contact head 48 to close a circuit 49 by which the stop lights of the trailer may be lighted.

The spring 14 tends to move the solenoid plunger 13 out of the stator of the solenoid, and in order to provide means for automatically setting the brakes upon the trailer if it should break loose from the towing vehicle, the solenoid core is extended toward the left to project into a casing 50. A spring 51 is disposed in the casing 50 and bears against a ring 52. Spring 51 is of such strength as to overcome spring 14, and if spring 51 were released, it would thrust ring 52 to the right along the solenoid core or stem 13 until said ring, by striking against a collar 53 on stem 13, thrusts said stem inwardly into the solenoid stator to thereby apply the brakes independently of any electrical energization of the solenoid. However, ring 52 is normally held in the position shown, in which spring 51 is compressed and the solenoid is free to act in its usual way, by a pin 54, which projects through the bottom of the casing and upwardly into the path of movement of ring 52.

A cable 55 is attached to the head 56 of the pin, said cable having a snap hook 57 at its end, which, in use, is hooked into engagement with any convenient part of the towing vehicle. An easily breakable link 58 has one end attached to the cable at 59 and has its other end attached at 60 to a block that is supported from the casing 61, in which the cylinder 22 and associated mechanisms are mounted. If then, the trailer should break loose from the towing vehicle, the pull upon cable 55 would break link 58 and permit the pull upon the cable to pull pin 54 out of the path of ring 52. Spring 51 would then act as described to thrust ring 52 against collar 53, moving plunger rod 20, as previously described, into cylinder 22 to set the brakes by moving the brake shoes 42.

I claim:

1. In a pressure operated, electrically actuated mechanism for moving the plunger of a master brake cylinder, a movable lever connected to an operating rod of the master brake plunger, a solenoid magnet having a group of annular windings disposed in alignment to constitute the stator of the solenoid, a solenoid core moving through said stator to a degree determined by which of the annular windings is energized, means connecting said core to said lever, means tending to move the solenoid core out of the stator, a second and stronger means tending to project the core into said stator, a detent for holding the second means out of action and a cable attached to the detent for releasing the second means to permit the latter means to project the core into the solenoid stator independently of the electrical energization of the coils of said stator.

2. In a pressure operated, electrically actuated mechanism for moving the plunger of a master brake cylinder on a towed vehicle, a movable lever connected to an operating rod of the master brake plunger, a solenoid magnet having a group of annular windings disposed in alignment to constitute the stator of the solenoid, a solenoid core moving through said stator to a degree determined by which of the annular windings is energized, means connecting said core to said lever, in combination with means for automatically setting the brakes upon the towed vehicle if the towed and towing vehicles separate, said means comprising a spring tending to move the solenoid core out of the stator, a second and a stronger spring tending to project the core into the stator, a detent for holding the second spring means out of action, a cable attached to the detent for releasing the second spring to permit said spring to project the core into the solenoid stator independently of the electrical energization of the coils of the solenoid magnet, and means upon the cable for attaching it to the towing vehicle.

3. In a pressure operated, electrically actuated mechanism for moving the plunger of a master brake cylinder on a towed vehicle, a movable lever connected to an operating rod of the master brake plunger, a solenoid magnet having a group of annular windings disposed in alignment to constitute the stator of the solenoid, a solenoid core moving through said stator to a degree determined by which of the annular windings is energized, means connecting said core to said lever, in combination with means for automatically setting the brakes upon the towed vehicle if the towed and towing vehicles separate, said means comprising a spring tending to project the core into the stator, a detent for holding the second spring means out of action, a cable attached to the detent for releasing the second spring to permit said spring to project the core into the solenoid stator independently of the electrical energization of the coils of the solenoid magnet, means upon the cable for attaching it to the towing vehicle, and an easily breakable link disposed intermediate the length of the cable and attached to the cable and to a support on the towed vehicle, and normally aiding in supporting the weight of the cable, until tension is imposed upon said cable by separation of the towing and towed vehicles.

References Cited by the Examiner

UNITED STATES PATENTS

| | | | |
|---|---|---|---|
| 1,882,852 | 10/32 | McConkey | 188—163 X |
| 2,136,835 | 11/38 | Begg | 60—54.6 |
| 2,169,668 | 8/39 | Thomas | 188—3 |
| 2,299,932 | 10/42 | Scott | 188—152 |
| 2,454,291 | 11/48 | Penrose | 303—7 X |
| 2,790,043 | 4/57 | Clason | 200—83.2 |

EUGENE G. BOTZ, *Primary Examiner.*

A. JOSEPH GOLDBERG, ARTHUR L. LA POINT,
*Examiners.*